(12) United States Patent
Mayer et al.

(10) Patent No.: US 12,507,879 B2
(45) Date of Patent: Dec. 30, 2025

(54) DISTAL END HAVING A FREE SPACE BETWEEN CAMERA AND WORKING CHANNEL

(71) Applicant: HOYA CORPORATION, Tokyo (JP)

(72) Inventors: Wolfgang Mayer, Friedberg (DE); Anh Minh Do, Munich (DE)

(73) Assignee: HOYA CORPORATION, Tokyo (JP)

( * ) Notice: Subject to any disclaimer, the term of this patent is extended or adjusted under 35 U.S.C. 154(b) by 277 days.

(21) Appl. No.: 18/283,326

(22) PCT Filed: Mar. 16, 2022

(86) PCT No.: PCT/IB2022/052356
§ 371 (c)(1),
(2) Date: Sep. 21, 2023

(87) PCT Pub. No.: WO2022/200922
PCT Pub. Date: Sep. 29, 2022

(65) Prior Publication Data
US 2024/0172932 A1    May 30, 2024

(30) Foreign Application Priority Data
Mar. 23, 2021 (DE) .......................... 102021107191.7

(51) Int. Cl.
*A61B 1/00* (2006.01)
*A61B 1/018* (2006.01)
*A61B 1/05* (2006.01)

(52) U.S. Cl.
CPC ............ *A61B 1/051* (2013.01); *A61B 1/0008* (2013.01); *A61B 1/018* (2013.01)

(58) Field of Classification Search
CPC ....... A61B 1/051; A61B 1/0008; A61B 1/018; A61B 1/00089; A61B 1/00096
See application file for complete search history.

(56) References Cited

U.S. PATENT DOCUMENTS

| | | | |
|---|---|---|---|
| 4,419,987 A * | 12/1983 | Ogiu | A61B 1/2736 600/176 |
| 11,304,595 B2 | 4/2022 | Do et al. | |
| 11,324,389 B2 | 5/2022 | Do | |
| 11,369,255 B2 | 6/2022 | Do | |

(Continued)

FOREIGN PATENT DOCUMENTS

| | | |
|---|---|---|
| EP | 3788940 A1 | 3/2021 |
| JP | H02-114005 U | 9/1990 |

(Continued)

OTHER PUBLICATIONS

Notice of Reasons for Refusal issued in Japanese Patent Application No. 2023-544591, dated Apr. 23, 2024, together with an English translation.

(Continued)

*Primary Examiner* — Timothy J Neal
(74) *Attorney, Agent, or Firm* — Greenblum & Bernstein, P.L.C.

(57) ABSTRACT

An endoscope including an endoscope head having a housing, an examination supporting member on the distal end of the housing, and a working channel extending in the endoscope head, the working channel being formed in a hose-like or tubular working channel member and in the housing which is provided distally from the working channel member, wherein the housing has a working channel member receiving surface that faces the working channel member. On the proximal side of the working channel member receiving surface of the housing, the examination supporting member faces, in the radial direction of the working channel, a peripheral portion of the working channel member via a free space.

4 Claims, 7 Drawing Sheets

(56) References Cited

U.S. PATENT DOCUMENTS

| | | | |
|---|---|---|---|
| 11,612,304 B2 | 3/2023 | Viebach et al. | |
| 2005/0154262 A1 | 7/2005 | Banik et al. | |
| 2005/0251108 A1* | 11/2005 | Frassica | A61B 1/00148 |
| | | | 600/101 |
| 2016/0373624 A1 | 12/2016 | Imai | |
| 2018/0084974 A1 | 3/2018 | Wake et al. | |
| 2019/0282071 A1 | 9/2019 | Ouyang et al. | |
| 2021/0093169 A1 | 4/2021 | Ouyang et al. | |
| 2023/0148842 A1 | 5/2023 | Schroeter | |

FOREIGN PATENT DOCUMENTS

| | | | | |
|---|---|---|---|---|
| JP | H07-134256 A | 5/1995 | | |
| JP | 2013-240436 A | 12/2013 | | |
| JP | 2014-57731 A | 3/2014 | | |
| JP | 5932179 B | 5/2016 | | |
| JP | 2017-217250 A | 12/2017 | | |
| WO | WO-2019102679 A1 * | 5/2019 | | A61B 1/00 |

OTHER PUBLICATIONS

Examiner's Reconsideration Report issued in Japanese Patent Application No. 2023-544591, dated Oct. 4, 2024.

International Search Report issued in WIPO Patent Application No. PCT/IB2022/052356, dated Jun. 21, 2022.

Decision of Refusal issued in Japanese Patent Application No. 2023-544591, dated Jul. 2, 2024, together with an English translation.

Notice of Reasons for Refusal issued in counterpart Japanese Patent Application No. 2024-123509, dated Apr. 22, 2025, together with an English translation.

Notice of Reasons for Refusal issued in counterpart Japanese Patent Application No. 2023-544591, dated Apr. 15, 2025, together with an English translation.

Decision of Refusal issued in Japanese Patent Application No. 2024-123509, dated Jul. 1, 2025, together with an English translation.

* cited by examiner

DISTAL END HAVING A FREE SPACE BETWEEN CAMERA AND WORKING CHANNEL

The present invention relates to an endoscope comprising an endoscope head, an examination supporting member at the distal end of the endoscope head, and a working channel extending in the endoscope head, the working channel being formed in a hose-like or tubular working channel member and in a distal working channel end member provided distally from the working channel member in the housing of the endoscope head, and the working channel member abuts on the proximal side of the working channel end member.

The examination supporting member is a camera, for example.

Such an endoscope is shown in FIGS. 7 to 9. These Figures show an endoscope head housing 200 of an endoscope head from the proximal side. In the endoscope head housing 200, a camera (not shown) is arranged in a camera opening 220. Furthermore, a working channel member (not shown) is inserted in a working channel member insertion opening 212 in the endoscope head housing 200. When inserted in the endoscope, the camera extends from the camera opening 220 and the working channel member extends from the working channel member insertion opening 212 in a proximal direction parallel to each other.

A distal working channel opening 210 is arranged in the endoscope head housing 200 distally from the working channel member insertion opening 212. The working channel member insertion opening 212 and the distal working channel opening 210 lie on the same axis and extend coaxially with respect to each other. The inner diameter of the working channel member insertion opening 212 is greater than the inner diameter of the distal working channel opening 210. A proximal contact surface 211 is formed at the transition between the working channel member insertion opening 212 and the distal working channel opening 210, the contact surface 211 forming a perpendicular surface to the wall surface of the working channel member insertion opening 212 and the wall surface of the distal working channel opening 210.

In particular, the working channel member insertion opening 212 in the endoscope head housing 200 is formed such that it has an inner diameter which is adapted to the outer diameter of the working channel member to be inserted.

Here, the distal region of the endoscope head housing 200 around the distal working channel opening 210 forms the distal working channel end member. The proximal contact surface 211 serves as a working channel member receiving surface. The working channel member is thereby held at the working channel member insertion opening 212.

The object of the invention is to provide an endoscope that is as small as possible, in which a working channel member is held in the housing of the endoscope head.

This object is achieved by an endoscope comprising the features of claim 1. An alternative endoscope is shown in claim 2. Advantageous developments are the subject matter of the dependent claims.

The invention thus relates to an endoscope comprising an endoscope head, the endoscope head including: a housing; an examination supporting member on the distal end of the housing, and a working channel extending in the endoscope head, the working channel being formed in a hose-like or tubular working channel member and in the housing which is provided distally from the working channel member; wherein the housing has a working channel member receiving surface that faces the working channel member. On the proximal side of the working channel member receiving surface of the housing, the examination supporting member faces in the radial direction of the working channel a peripheral portion of the working channel member via a free space.

Since, in the radial direction of the working channel, no wall is formed and there is merely the free space between the working channel member and the examination supporting member, the distance between the working channel member and the examination supporting member can be kept small. The working channel member and the examination supporting member can be arranged close to each other. An endoscope having a small outer diameter but a relatively large working channel inner diameter can be provided.

The invention further relates to an endoscope comprising an endoscope head, the endoscope head including: a housing; an examination supporting member on the distal end of the housing, and a working channel extending in the endoscope head, the working channel being formed in a hose-like or tubular working channel member and in the housing which is provided distally from the working channel member; wherein the housing has a working channel member receiving surface that faces the working channel member. On the proximal side of the working channel member receiving surface of the housing, the examination supporting member abuts on a peripheral portion of the working channel member in the radial direction of the working channel.

Since, in the radial direction of the working channel, the working channel member and the examination supporting member abut against each other, the distance between the working channel member and the examination supporting member can be optimized to a minimum. The working channel member and the examination supporting member can be arranged side by side. The working channel member and the examination supporting member can be arranged to be in contact with each other. An endoscope having a small outer diameter but a relatively large working channel inner diameter can be provided.

The examination supporting member can be embedded in the housing of the endoscope head.

The examination supporting member can be embedded in the housing of the endoscope head at a location at least radially from the working channel member receiving surface. Thus, the examination supporting member is located radially outside of the working channel member receiving surface. In other words, at least a portion of the examination supporting member is accommodated adjacent to the working channel member receiving surface when viewed in the extension direction of the endoscope head.

A holder can be provided at the outer periphery of the distal portion of the working channel member on a region, where the examination supporting member is not provided, at the proximal side of the working channel member receiving surface, the holder supporting the distal end portion of the working channel member at a peripheral portion of the distal end portion of the working channel member. The holder can be located radially from the distal end portion of the working channel member. Thus, the holder at least sectionally holds the outer periphery of the distal end portion of the working channel member along the peripheral portion. The holder can at least be formed on a portion of the periphery at the outside of the distal end portion of the working channel member.

The holder can have an inner shape facing the distal end portion of the working channel member, the inner shape being adapted to the outer periphery of the distal end portion of the working channel member and being in surface contact with the outer periphery of the distal end portion of the working channel member. Due to the contact surface between the holder and the distal end portion of the working channel member, the holder can stationarily support the distal end portion of the working channel member in a precise position and in a particularly advantageous manner.

The holder can be integral with the housing. As a result, the holder does not have to be fastened separately. The working channel member can be held securely on the housing without any additional fastening means.

The working channel member can be spaced apart from the working channel member receiving surface. The space between the working channel member receiving surface and the working channel member can be used to receive tolerances between the working channel member receiving surface and the working channel member. Thus, even a working channel member with a distal front face that is not completely flat can be arranged opposite the working channel member receiving surface.

A sealing ring can be arranged between the working channel member receiving surface and the distal front face of the working channel member, wherein the sealing ring has an inner opening, wherein the inner opening of the sealing ring forms part of the working channel. The working channel thus extends coming from the proximal side through the working channel member, the sealing ring and the endoscope head.

The working channel member can abut on the working channel member receiving surface. The working channel transitions virtually seamlessly from the working channel member into the working channel portion in the endoscope head. This enables a shoulder-free design of the transition from the working channel member into the working channel portion in the endoscope head.

The examination supporting member can be a camera from which either a portion at the proximal side of the working channel member receiving surface protrudes in the proximal direction, or the wiring of which connected to the camera and extending proximally from the camera protrudes in the proximal direction at the proximal side of the working channel member receiving surface.

Alternatively, the examination supporting member can be an illumination device, a wiring of an illumination device, an Albarran lever operable from the proximal side of the endoscope, an actuation wire of an Albarran lever, a flushing nozzle, a flushing nozzle channel member, or another working channel member.

The aspects of the present invention explained above can be suitably combined.

BRIEF DESCRIPTION OF THE DRAWINGS

The FIGS. 7 to 9 each show a schematic perspective view of an endoscope head according to the prior art from the proximal side. In particular.

Figure 1:
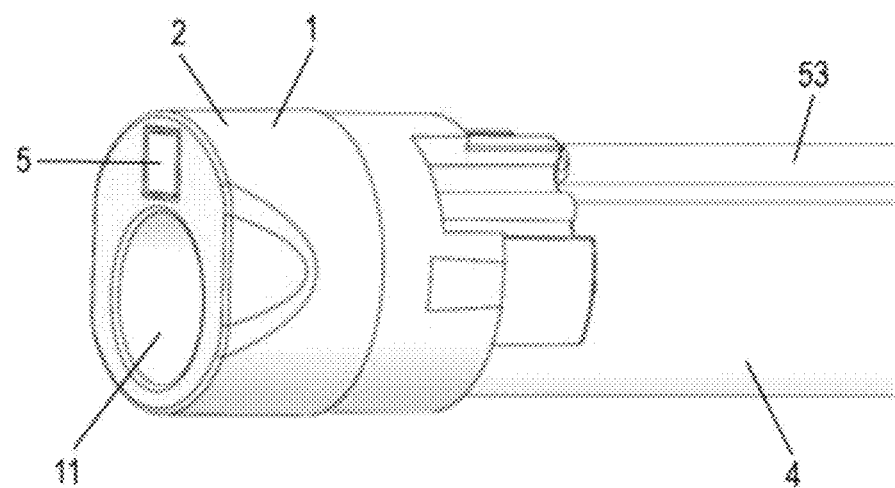
FIG. 1 shows a schematic perspective view of an endoscope head according to the invention in a first embodiment.
Figure 2:
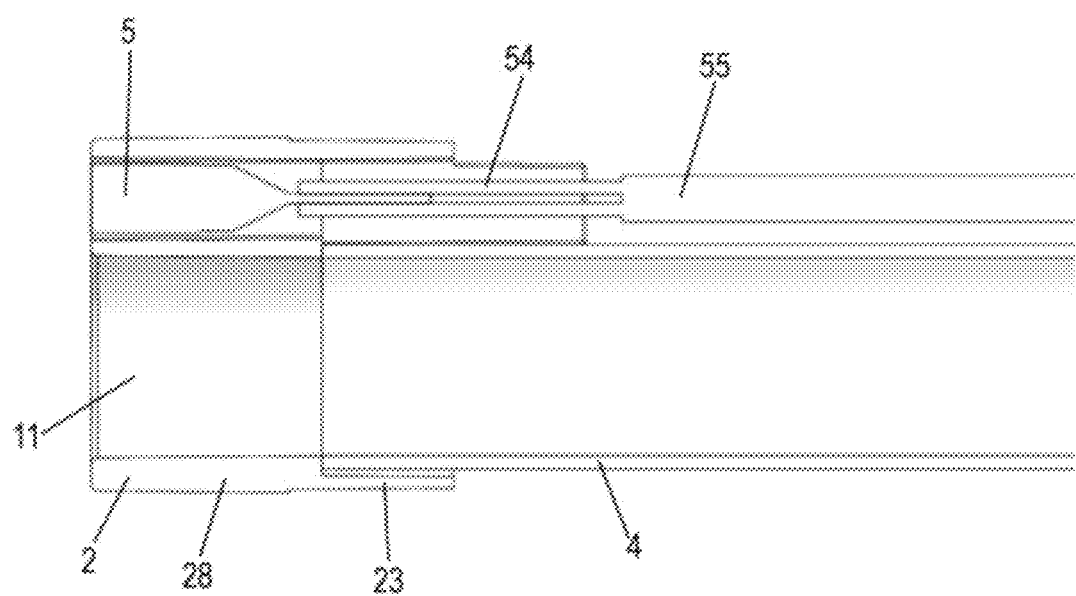
FIG. 2 shows a schematic cross-sectional side view of the endoscope head from FIG. 1.

The present invention is described in detail below with reference to the drawings on the basis of embodiments. The illustrations in the drawings are not necessarily to scale, but are sometimes shown distorted for reasons of clarity.

First Embodiment

Referring to FIGS. 1 to 5, a first embodiment of the present invention is described below.

An endoscope head 1 according to the invention is connected to a control body, which is not shown, via an endoscope tube, which is not shown.

The endoscope head 1 is arranged at the distal end of the endoscope. The endoscope head 1 includes an endoscope head housing 2. A camera 5 as an examination supporting member and a distal working channel opening 21 are provided in the endoscope head housing 2. Further (not shown) optional means, such as an Albarran lever, a nozzle opening for discharging a cleaning medium (water, air) for cleaning a distal window of the camera 5, an illumination device (LED or light guide) for illuminating a scene captured by the camera 5, etc., can be provided in the endoscope head housing 2.

A working channel member 4 which ends in the endoscope head housing 2 extends through the endoscope tube.

The endoscope head housing 2 is described in more detail below.

The endoscope head housing 2 can be made of plastic, although the invention is not limited thereto. The endoscope head housing 2 preferably has a cylindrical outer shape, as shown schematically in FIG. 1. The endoscope head housing 2 has an axis and a longitudinal extension extending along the axis.

The endoscope head housing 2 is made of a distal housing base body 28 and a proximal housing extension 23 which extends proximally from the distal housing base body 28.

The distal housing base body 28 has a disc-like structure. The distal housing base body 28 has a distal front face forming a distal surface of the endoscope head housing 2. The distal housing base body 28 has a proximal surface 25.

The endoscope head housing 2 has the distal working channel opening 21 which forms a distal opening of the working channel described in more detail below. The distal working channel opening 21 preferably extends in parallel to the axis of the endoscope head housing 2. The distal working channel opening 21 is formed as a circular opening, for example. The distal working channel opening 21 preferably has a circular cross-section, but can also have an oval, polygonal, elliptic or similar cross-section suitable for the interior of the working channel to convey an instrument through the working channel. The distal working channel opening 21 has a working channel inner wall 11. The working channel inner wall 11 forms a distal end portion of the working channel.

The endoscope head housing 2 has a distal camera opening 22 in which the camera 5 is arranged. The distal camera opening 22 preferably extends parallel to the axis of the endoscope head housing 2. The camera 5 is arranged in the distal camera opening 22. In the embodiment, the distal camera opening 22 is shown as a square opening. Alternatively, the distal camera opening 22 can have a circular, oval, polygonal, elliptic or similar cross-section that is adapted to an outer shape of the camera 5 arranged therein.

Preferably, the camera 5 is arranged in the distal camera opening 22 such that a distal surface of the camera 5 is aligned with the distal front face of the endoscope head housing 2 (i.e. the distal housing base body 28).

The camera 5 is connected to a camera cable 53 that extends in the proximal direction. For example, the camera cable 53 can extend up to the proximal control body.

The camera cable 53 can preferably include a coated camera cable 55. Camera cables 54 to which the camera 5 is connected extend from the coated camera cable 55. The designs of the cables 54, 55 can be chosen freely and are not limited in the invention. The cables 54, 55 can serve the power supply of the camera 5 and the transmission of image signals.

Figure 3:
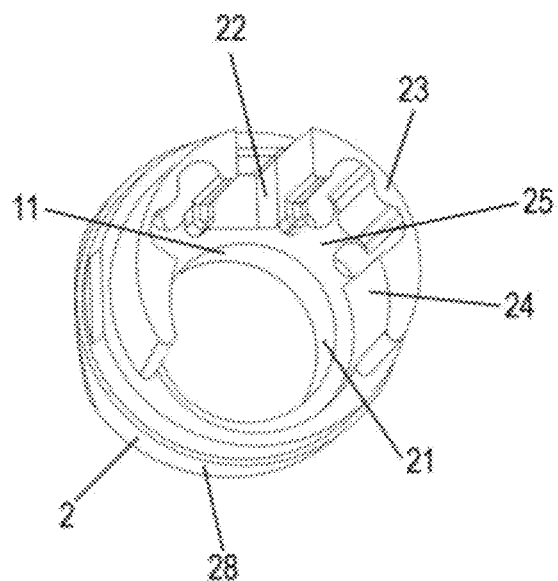
FIG. 3 shows a schematic perspective view of the endoscope head from FIG. 1 from the proximal side.
Figure 4:
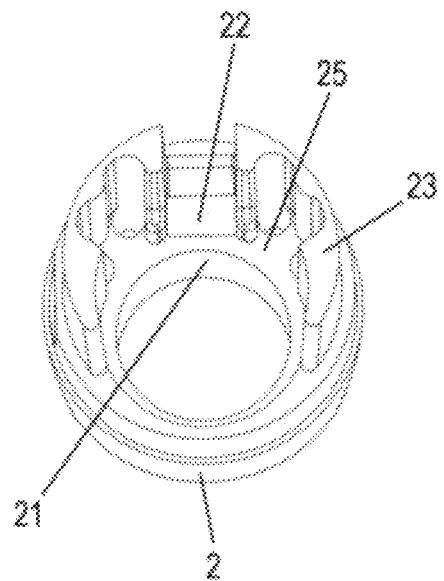
FIG. 4 shows a schematic perspective view of the endoscope head from FIG. 1 from the proximal side.
Figure 5:
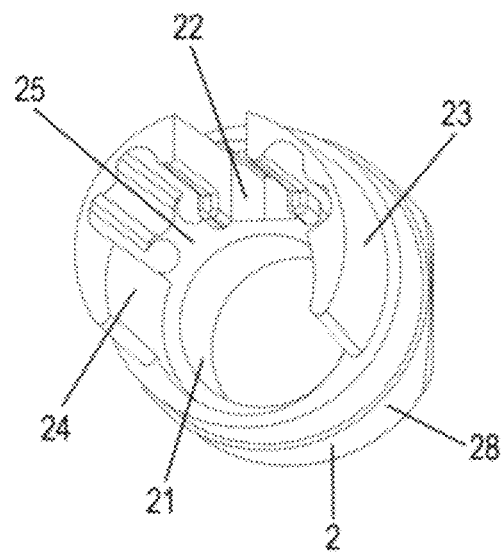
FIG. 5 shows a schematic perspective view of the endoscope head from FIG. 1 from the proximal side.

The proximal housing extension 23 extends in the proximal direction from the proximal surface 25 of the distal housing base body 28. The distal housing base body 28 and the proximal housing extension 23 are integral. The distal housing base body 28 and the proximal housing extension 23 can be formed as a single body of, for example, plastic. Alternatively, the proximal housing extension 23 can be glued or otherwise connected to the distal housing base body 28. The proximal housing extension 23 is formed to surround an extension of the distal working channel opening 21 projected in the proximal direction. The proximal housing extension 23 sectionally (incompletely) surrounds the extension of the distal working channel opening 21 projected in the proximal direction, as shown in FIGS. 3 to 5. The proximal housing extension 23 thus forms a wall portion around the extension of the distal working channel opening 21 projected in the proximal direction. Therefore, the wall portion formed by the proximal housing extension 23 does not fully surround the extension of the distal working channel opening 21 projected in the proximal direction.

In the embodiment, the proximal housing extension 23 forms, more specifically, two wall portions around the extension of the distal working channel opening 21 projected in the proximal direction.

The region proximal to the proximal surface 25 between the extension of the distal working channel opening 21 projected in the proximal direction and the extension of the distal camera opening 22 projected in the proximal direction is free from the proximal housing extension 23. No portion of the endoscope head 1 is formed at the proximal side of the proximal surface 25 between the distal working channel opening 21 and the distal camera opening 22. A free space is formed at the proximal side of the proximal surface 25 between the distal working channel opening 21 and the distal camera opening 22.

The proximal housing extension 23 extending proximally from the proximal surface 25 has an inwardly facing wall 24, said inwardly facing wall forming an inner peripheral wall portion 24 of the proximal housing extension 23. The inwardly facing wall 24 is not provided on the proximal side of the proximal surface 25 between the distal working channel opening 21 and the distal camera opening 22.

The distal working channel opening 21 and the distal camera opening 22 penetrate the distal housing base body 28.

The camera 5 is arranged in the distal camera opening 22 such that the camera 5 is embedded in the distal camera opening 22. The body of the camera 5 itself does not protrude from the distal camera opening 22 in the distal direction. Only the camera cables 54 connected to the camera 5 protrude from the distal camera opening 22 in the distal direction. The camera cables 54 are, for example, a non-coated camera cable connected to the coated camera cable 55. The camera 5 can be inserted, clamped, bonded or otherwise firmly arranged in the distal camera opening 22.

The working channel is described in more detail below.

In the endoscope of the present embodiment, the working channel is formed from the working channel inner wall 11 of the distal working channel opening 21 arranged in the distal housing base body 28 and the inner wall of the working channel member 4 located proximal to the distal working channel opening 21. The working channel member 4 is formed in a hose-like or tubular manner and is embedded in the endoscope along the longitudinal extension of the endoscope. The working channel member 4 extends away from the endoscope head 1 in the proximal direction in the length desired by the endoscope manufacturer to a proximal working channel entrance opening that is not shown.

Thus, the working channel is formed in the endoscope by a proximal portion in the working channel member 4 (the working channel inner wall of the working channel member 4) and in distal connection thereto by the distal portion of the working channel in the distal housing base body 28 (of the working channel inner wall 11).

The proximal surface 25 of the distal housing base body 28 faces the working channel member 4.

In the present embodiment, the working channel member 4 is arranged on the proximal surface 25. In other words, the working channel member 4 is seated on the proximal surface 25. Thus, the working channel member 4 abuts on the proximal surface 25.

The distal front face of the working channel member 4 is a flat (planar) surface. The distal front face of the working channel member 4 abuts on the proximal surface 25 without a gap (without clearance).

The working channel opening 21 has the same inner diameter dimension as the working channel member 4. The working channel opening 21 and the working channel member 4 are centered such that no shoulder is formed at the transitions of the working channel opening 21 to the working channel member 4.

The proximal surface 25 of the distal housing base body 28 therefore forms a working channel member receiving surface.

The inwardly facing wall 24 extending proximally from the proximal surface acts as holder for the working channel member 4. The inwardly facing wall 24 is formed to be bulged toward the inside. In other words, the inwardly facing wall 24 is formed in an arcuate or curved manner along the periphery. The inwardly facing wall 24 is formed concentrically to the working channel opening 21. The inwardly facing wall 24 has an inner diameter corresponding to the outer diameter of the working channel member 4.

Thus, the outer wall of the working channel member 4 abuts on the inwardly facing wall 24. The inwardly facing wall 24 therefore holds the working channel member 4.

The inwardly facing wall 24 forms a holder for the working channel member 4. The inwardly facing wall 24 has an inner shape facing the distal end portion of the working channel member 4, the inner shape being adapted to the outer periphery of the distal end portion of the working channel member 4 and being in surface contact with the outer periphery of the distal end portion of the working channel member 4.

Considering FIGS. 3 to 5, the inwardly facing wall 24 is divided into a first (on the right in FIGS. 3-5) and second (on the left in FIGS. 3-5) portion of the inwardly facing wall 24.

The first portion of the inwardly facing wall 24 is located on a (right) side of the distal camera opening 22, see FIGS. 3 to 5. The second portion of the inwardly facing wall 24 is located on the other (left) side of the distal camera opening 22.

The first and second portions of the inwardly facing wall 24 are spaced apart from each other.

The first and second portions of the inwardly facing wall 24 are spaced apart from each other in the peripheral direction at the distal camera opening 22. The first and second portions of the inwardly facing wall 24 are spaced apart from each other in a diametrical direction at the distal working channel opening 21.

The first portion of the inwardly facing wall 24 and the second portion of the inwardly facing wall 24 oppose each other in the region of the distal camera opening 22 in the peripheral direction of the endoscope housing 2. In this region, when viewed in the radial direction, the connection of the camera 5 (e.g. the cables 54, 55) opposes the working channel member 4.

In other words, at the proximal side of the proximal surface 25 of the endoscope housing 2, the camera 5 (e.g. the cables 54, 55) faces in the radial direction of the working channel a peripheral portion of the working channel member 4 via a free space.

The working channel member 4 can be bonded to the proximal surface 25.

The proximal front face of the working channel member 4 can be bonded to the proximal surface 25. Alternatively or additionally, the outer wall can be bonded to the inwardly facing wall 24 in the distal region of the working channel member 4.

Effects of the Embodiment

In the first embodiment, the working channel member 4 is securely held to the endoscope head housing 2.

Nevertheless, the wall portion of the inwardly facing wall 24 in the region proximally from the proximal surface 25 between the working channel and the camera can be omitted. In other words, there is no portion of the endoscope head housing 2 between the working channel member 4 and the camera 5. Thus, proximally from the proximal surface 25, there is no wall between the working channel member 4 and the camera.

By omitting this wall portion, not only material of the endoscope head housing 2 is saved. The outer diameter of the endoscope head housing 2 can also be designed smaller, since the working channel and the camera can be arranged close to each other. As a result, space can be created in the endoscope for a larger working channel (larger diameter) while the outer diameter remains the same. Thus, an endoscope having a small outer diameter can be created in which nevertheless relatively large instruments can slide through the working channel.

Modification of the First Embodiment

A certain interference fit can be present in a modification of the first embodiment, so that the working channel member 4 is held clamped by the inwardly facing wall 24. In this case, the outer diameter of the working channel member 4 is so suitably larger than the inner diameter of the inwardly facing wall 24 that a press fit of the working channel member 4 is created at the inwardly facing wall 24. In this modification, the working channel member 4 does not have to be bonded. However, bonding can be additionally carried out.

Second Embodiment

Figure 6:
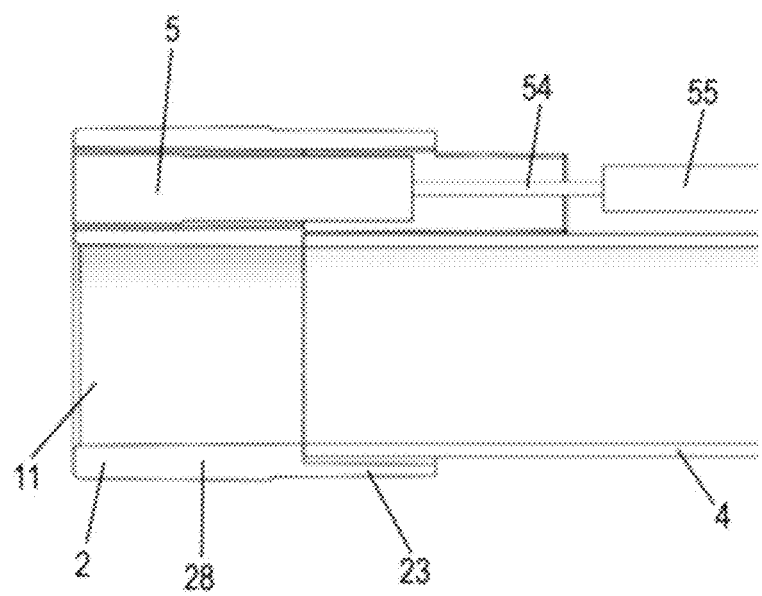
FIG. 6 shows a schematic cross-sectional side view of an endoscope head according to the invention in a second embodiment.
Figure 7:
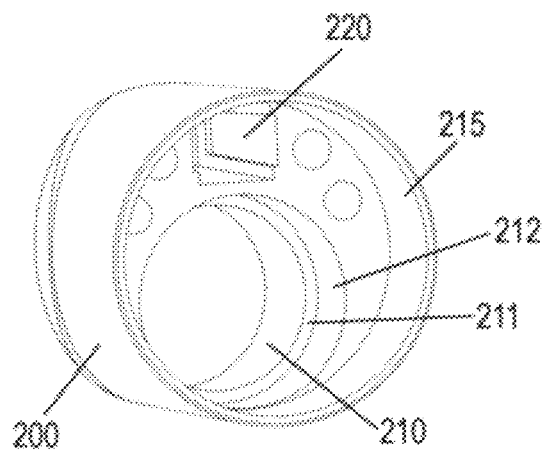
FIG. 7 shows the endoscope head when viewed from the left.
Figure 8:
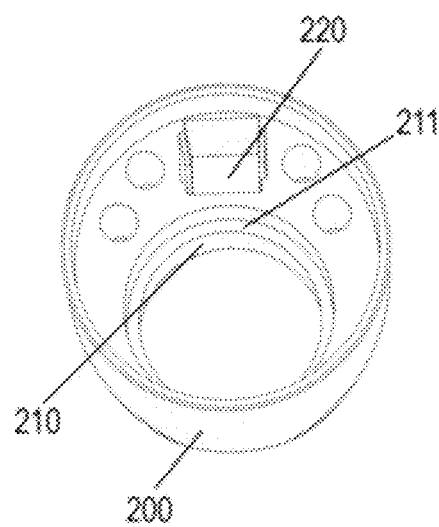
FIG. 8 shows the endoscope head when viewed from the center.
Figure 9:
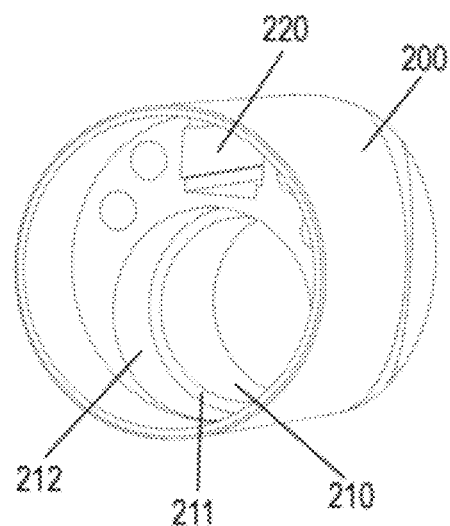
FIG. 9 shows the endoscope head when viewed from the right.

Referring to FIG. 6, a second embodiment of the present invention is described below.

The second embodiment differs from the first embodiment by a modified structure of a camera housing as examination supporting member. The remaining structure is the same as in the first embodiment and therefore will not be described again.

In the second embodiment, a camera 5 is arranged in the distal camera opening 22 such that the body of the camera 5 protrudes from the distal camera opening 22 in the proximal direction.

A camera cable 54 connected to the camera 5 extends from the camera 5 in the distal direction. The camera cable 54 is, for example, a non-coated camera cable that is connected to a coated camera cable 55.

The camera cable 55 extends in the proximal direction. For example, the camera cable 55 can extend to the proximal control body.

The camera cable 55 is preferably a coated camera cable 55. The camera cable 54 to which the camera 5 is connected extends from the coated camera cable 55. The designs of the cables 54, 55 can be freely chosen and are not limited in the invention. The cables 54, 55 can serve to supply power to the camera 5 and to transmit image signals.

The portion of the body of the camera 5, which protrudes in the proximal direction from the distal camera opening 22, forms a proximal portion of the camera 5 and faces the outer wall of the working channel member 4, as shown in FIG. 6. In other words, the portion of the body of the camera 5, which protrudes in the proximal direction from the distal camera opening 22, is arranged radially outwardly from a distal end portion of the working channel member 4. When viewed in the radial direction of the endoscope, a proximal portion of the camera 5 and a distal portion of the working channel member 4 overlap.

When viewed in the radial direction, no portion of the wall 24 (and no portion of the extension 23) is formed in the endoscope head housing 2 in the region where the proximal portion of the camera 5 and the distal end portion of the working channel member 4 face each other. At the proximal side of the proximal surface 25, no portion of the endoscope head 1 is formed between the distal working channel opening 21 and the distal camera opening 22. At the proximal side of the proximal surface 25, a free space is formed between the distal working channel opening 21 and the distal camera opening 22. The free space is between the camera 5 and the working channel member 4. In other words, the free space is between the camera 5 and the working channel.

Thus, in this embodiment, the camera 5 and the working channel member 4 can be arranged particularly close to each other.

The same effects as in the first embodiment also result in the second embodiment. There is no wall between the working channel member 4 and the camera 5.

Modification of the Second Embodiment

Figure 11:
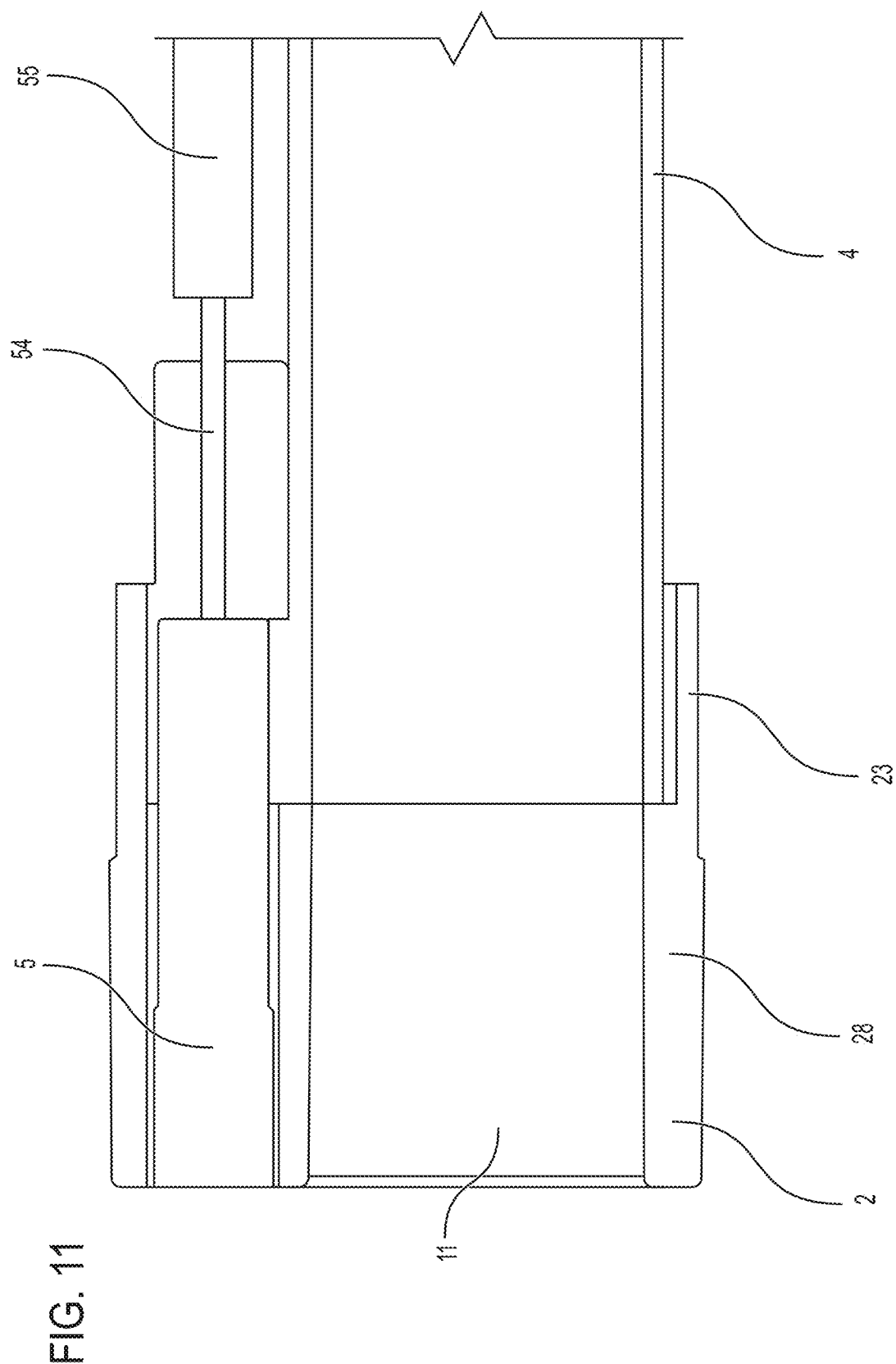
FIG. 11 shows a schematic cross-sectional side view of an endoscope head according to a modification of the second embodiment.

In a modification of the second embodiment that is shown in FIG. 11, the camera 5 and the working channel member 4 can even be arranged so close to each other that they abut against each other. In this case, the portion of the body of the camera 5 that protrudes in the proximal direction from the distal camera opening 22 (proximal portion of the camera 5) can abut on the distal end portion of the working channel member 4. Then, the portion of the body of the camera 5 protruding in the proximal direction from the distal camera opening 22 forms a portion of a wall abutting on the outer periphery of the working channel member 4 in a region between the two portions of the wall 24 of the first embodiment. At the proximal side of the proximal surface 25, no portion of the endoscope head 1 is formed between the distal working channel opening 21 and the distal camera opening 22. At the proximal side of the proximal surface 25, a free space is formed between the distal working channel opening 21 and the distal camera opening 22.

Thus, in this modification, the outer wall of the working channel member 4 abuts, along the periphery of the working channel member 4, on the proximal portion of the camera 5 and on the first and second portions of the inwardly facing wall 24.

Here, at the proximal side of the proximal surface 25 of the endoscope head housing 2, the camera 5 abuts on a peripheral portion of the working channel member 4 in the radial direction of the working channel.

Thus, in the modification of the second embodiment, the free space at the proximal side of the proximal surface 25 between the distal working channel opening 21 and the distal camera opening 22 is filled by the wall of the working channel member 4.

Alternatives

The distal working channel opening 21 and/or the distal camera opening 22 need not extend parallel to the axis of the endoscope head housing 2. The distal working channel opening 21 and/or the distal camera opening 22 can extend at a predetermined angle to the axis of the endoscope head housing 2.

The distal working channel opening 21 and the distal camera opening 22 need not extend parallel to each other as in the embodiments. The distal working channel opening 21 and the distal camera opening 22 can extend (obliquely) to each other at a predetermined angle.

In the embodiments, the camera 5 is arranged in the distal camera opening 22 such that the distal surface of the camera 5 is aligned with the distal front face of the endoscope head housing 2. Alternatively, the camera 5 can protrude distally beyond the distal front face of the endoscope head housing 2.

In another alternative, the camera 5 can be offset in a proximal direction from the distal front face of the endoscope head housing 2.

In the embodiments, the proximal housing extension 23 sectionally surrounds the extension of the distal working channel opening 21 projected in the proximal direction, as shown in FIGS. 3 to 5. Alternatively, the proximal housing extension 23 can surround the extension of the distal working channel opening 21 projected in the proximal direction as a complete wall. Said complete wall surrounds the inserted camera on the radially outer side. The region proximal to the proximal surface 25 between the extension of the distal working channel opening 21 projected in the proximal direction and the extension of the distal camera opening 22 projected in the proximal direction can be free of the proximal housing extension 23.

In another alternative, the proximal housing extension 23 forms a single incomplete wall portion around the extension of the distal working channel opening 21 projected in the proximal direction, the wall portion being merely interrupted by the region of the distal camera opening 22. In this variant, the two wall portions of the wall 24 shown in FIGS. 3-5 are extended in the peripheral direction to such an extent that the proximal housing extension 23 is closed at the lower side shown in the drawings. Also in this variant, the region proximal to the proximal surface 25 between the extension of the distal working channel opening 21 projected in the proximal direction and the extension of the distal camera opening 22 projected in the proximal direction is free of the proximal housing extension 23.

Figure 10:
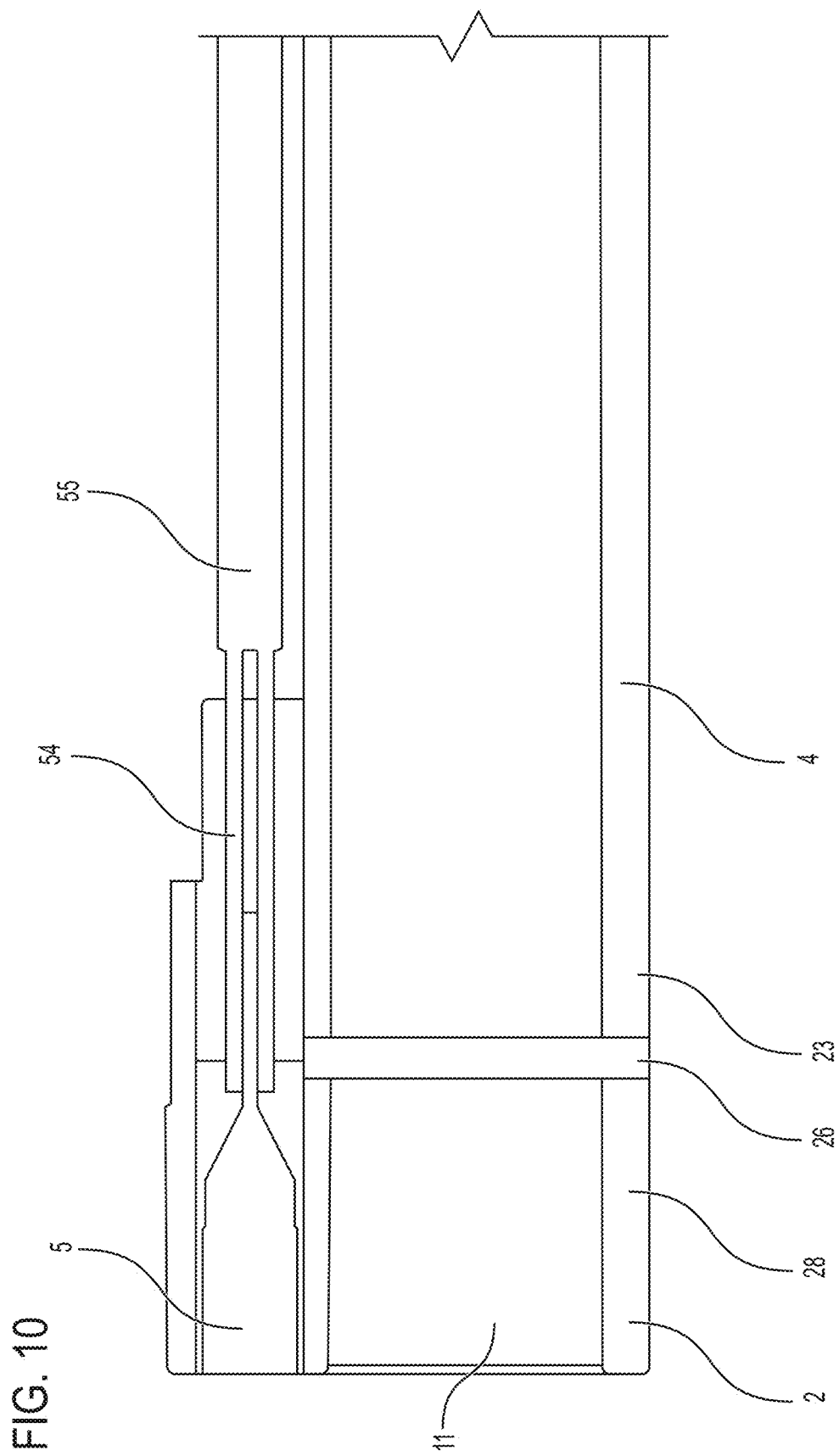
FIG. 10 shows a schematic cross-sectional side view of an endoscope head according to an alternative embodiment.

In the embodiments, the working channel member 4 abuts on the proximal surface 25. Alternatively, the working channel member 4 can be spaced apart from the proximal surface 25. As shown in FIG. 10, a sealing ring 26 can be disposed between the proximal surface 25 and the distal front face of the working channel member 4. The sealing ring 26 has an inner opening. The inner opening of the sealing ring 26 forms an inner peripheral wall. The inner peripheral wall preferably has the same inner diameter dimension as the working channel opening 21 and the working channel member 4. Said inner peripheral wall forms part of the working channel. The sealing ring 26 can be bonded to the proximal surface 25. The working channel member 4 can be bonded to the sealing ring 26. More specifically, the distal surface of the sealing ring 26 is bonded to the proximal surface 25, and the distal surface of the working channel member 4 is bonded to the proximal surface of the sealing ring 26. The working channel opening 21, the sealing ring 26 and the working channel member 4 are centered such that no shoulder is formed at the transitions of the working channel opening 21 to the sealing ring and from the sealing ring to the working channel member 4.

In the embodiments, the inner diameter of the inwardly facing wall 24 is equal to the outer diameter of the working channel member 4. In an alternative, the inner diameter of the inwardly facing wall 24 is larger than the outer diameter of the working channel member 4. On the radially inner side of the inwardly facing wall 24, a holding element can be arranged between the inwardly facing wall 24 and the outer wall of the working channel member 4. The holding element can be formed as a ring. However, it is only necessary that the holding element is arranged on the outer periphery of the working channel member 4 between the inwardly facing wall 24 and the outer wall of the working channel member 4. Thus, the holding element is not limited to the ring shape.

In a further alternative, the wall 24 can be omitted. In this case, the working channel member 4 is only sufficiently firmly bonded to the proximal surface 25 or to the sealing ring bonded thereto. Thus, the distal front face of the working channel member 4 is securely held to the endoscope head housing 2.

In the embodiments, a camera 5 is arranged in the endoscope head 1 as an examination supporting member. The invention is not limited thereto. In the endoscope head 1, an illumination device, a wiring of an illumination device (LED or light guide), an Albarran lever operable from the proximal side of the endoscope, an actuation wire of an Albarran lever, a flushing nozzle for a liquid (e.g., water, etc.), a flushing nozzle for air drying, a flushing nozzle for combined dispensing of liquid and air, a waterjet nozzle, a flushing nozzle channel member or another working channel member can be used as examination supporting member. In the invention, the structure can be designed in such a way that the distance between the examination supporting member and the working channel member 4 is optimized to a minimum.

The endoscope comprising the endoscope head according to the invention can be a bendable endoscope or a rigid endoscope.

LIST OF REFERENCE SIGNS 1 endoscope head
2 endoscope head housing
4 working channel member
5 camera; examination supporting member
11 working channel inner wall of the working channel opening 21
21 distal working channel opening in the endoscope head housing
22 distal camera opening in the endoscope head housing
23 proximal housing extension
24 inner peripheral wall portion of the proximal housing extension; holder
25 proximal surface (working channel member receiving surface)
28 distal housing base body
53 camera cable
54 camera cable without coating
55 coated camera cable
200 endoscope head housing
210 distal working channel opening in the endoscope head housing
211 proximal contact surface
212 working channel member insertion opening in the endoscope head housing
215 proximal housing wall
220 distal camera opening in the endoscope head housing

The invention claimed is:

1. An endoscope comprising:
an endoscope head, the endoscope head including:
 a housing;
 a camera on a distal end of the housing;
 a working channel extending in the endoscope head, the working channel being formed in a hose-shaped or tubular working channel member and in the housing which is provided distally from the working channel member;
 a sealing ring; and
 a holder;
wherein the housing has a working channel member receiving surface that faces the working channel member,
wherein on a proximal side of the working channel member receiving surface of the housing, the camera faces in a radial direction of the working channel a peripheral portion of the working channel member via a free space,
wherein the working channel member is spaced apart from the working channel member receiving surface in an axis direction of the working channel member,
wherein the holder supports a distal end portion of the working channel member at a circumference portion of the distal end portion of the working channel member, the holder comprising an inwardly facing wall extending proximally from the working channel member receiving surface,
wherein the circumference portion of the working channel member abuts on the inwardly facing wall,
wherein a portion of the inwardly facing wall is not present between the camera and a section of the circumference portion of the distal end portion of the working channel member,
wherein the section of the circumference portion faces the camera,
wherein the sealing ring is positioned between the working channel member receiving surface and a distal front surface of the working channel member, and
wherein the sealing ring has an inner opening forming a section of the working channel.

2. The endoscope according to claim 1, wherein the holder is integral with the housing.

3. The endoscope according to claim 1, wherein the camera is a camera from which either a portion protrudes on the proximal side of the working channel member receiving surface in a proximal direction, or wiring of which is connected to the camera and extending proximally from the camera protrudes in the proximal direction at the proximal side of the working channel member receiving surface.

4. An endoscope comprising:
an endoscope head, the endoscope head including:
 a housing;
 a camera on a distal end of the housing;
 a working channel extending in the endoscope head, the working channel being formed in a hose-shaped or tubular working channel member and in the housing which is provided distally from the working channel member;
 a sealing ring; and
 a holder;
wherein the housing has a working channel member receiving surface that faces the working channel member,
wherein on a proximal side of the working channel member receiving surface of the housing, the camera abuts on a peripheral portion of the working channel member in a radial direction of the working channel,
wherein the working channel member is spaced apart from the working channel member receiving surface in an axis direction of the working channel member,
wherein the holder supports a distal end portion of the working channel member at a circumference portion of the distal end portion of the working channel member, the holder comprising an inwardly facing wall extending proximally from the working channel member receiving surface,
wherein the circumference portion of the working channel member abuts on the inwardly facing wall,
wherein a portion of the inwardly facing wall is not present between the camera and a section of the circumference portion of the distal end portion of the working channel member,
wherein the section of the circumference portion faces the camera,
wherein the sealing ring is positioned between the working channel member receiving surface and a distal front surface of the working channel member, and
wherein the sealing ring has an inner opening forming a section of the working channel.

* * * * *